United States Patent [19]
Amino et al.

[11] Patent Number: 5,990,974
[45] Date of Patent: Nov. 23, 1999

[54] VIDEO SIGNAL PROCESSING APPARATUS

[75] Inventors: Tadashi Amino, Hyogo; Masako Otsuki, Osaka, both of Japan

[73] Assignee: Sanyo Electric Company, Ltd., Moriguchi, Japan

[21] Appl. No.: 08/726,298

[22] Filed: Oct. 2, 1996

[30] Foreign Application Priority Data

Oct. 3, 1995 [JP] Japan .................................. 7-256249

[51] Int. Cl.[6] .............................. H04N 9/74; H04N 5/268
[52] U.S. Cl. ........................... 348/588; 348/564; 348/705
[58] Field of Search .................................. 348/588, 564, 348/565, 563, 566, 567, 706, 705, 840, 383; H04N 9/74, 9/75, 5/445, 5/44, 5/262

[56] References Cited

U.S. PATENT DOCUMENTS

| | | | |
|---|---|---|---|
| 4,982,288 | 1/1991 | Isobe et al. | |
| 5,146,335 | 9/1992 | Kim et al. | 348/565 |
| 5,351,129 | 9/1994 | Lai | |
| 5,452,012 | 9/1995 | Saitoh | 348/563 |
| 5,801,788 | 9/1998 | Ashida et al. | 348/588 |

FOREIGN PATENT DOCUMENTS

| | | |
|---|---|---|
| 63187980 | 8/1988 | Japan . |
| 6292078 | 10/1994 | Japan . |
| 2 264 838 | 9/1993 | United Kingdom . |

OTHER PUBLICATIONS

European Patent Office Communication issued in European Patent Application No. 96115838.3–2202, dated Apr. 13, 1999.

*Primary Examiner*—Michael H. Lee
*Attorney, Agent, or Firm*—Armstrong, Westerman, Hattori, McLeland & Naughton

[57] ABSTRACT

A video signal processing apparatus includes a time-division multiplex circuit and a multi-display circuit. A video signals outputted from a first A/D converter included in the time-division multiplex circuit is applied to a memory included in the time-division multiplex circuit and a further memory included in the multi-display circuit. A video signal outputted from a second A/D converter included in the multi-display circuit is also written into the further memory. Then, video signals read-out from the further memory are outputted from a plurality of monitor screens. Since the video signal outputted from the first A/D converter is applied to the further memory, it is possible to increase a renewal speed of the monitor screens with no additional A/D converters in the multi-display circuit.

7 Claims, 13 Drawing Sheets

| 0 | 1 | 2 | 3 |
|---|---|---|---|
| 4 | 5 | 6 | 7 |
| 8 | 9 | 10 | 11 |
| 12 | 13 | 14 | 15 |

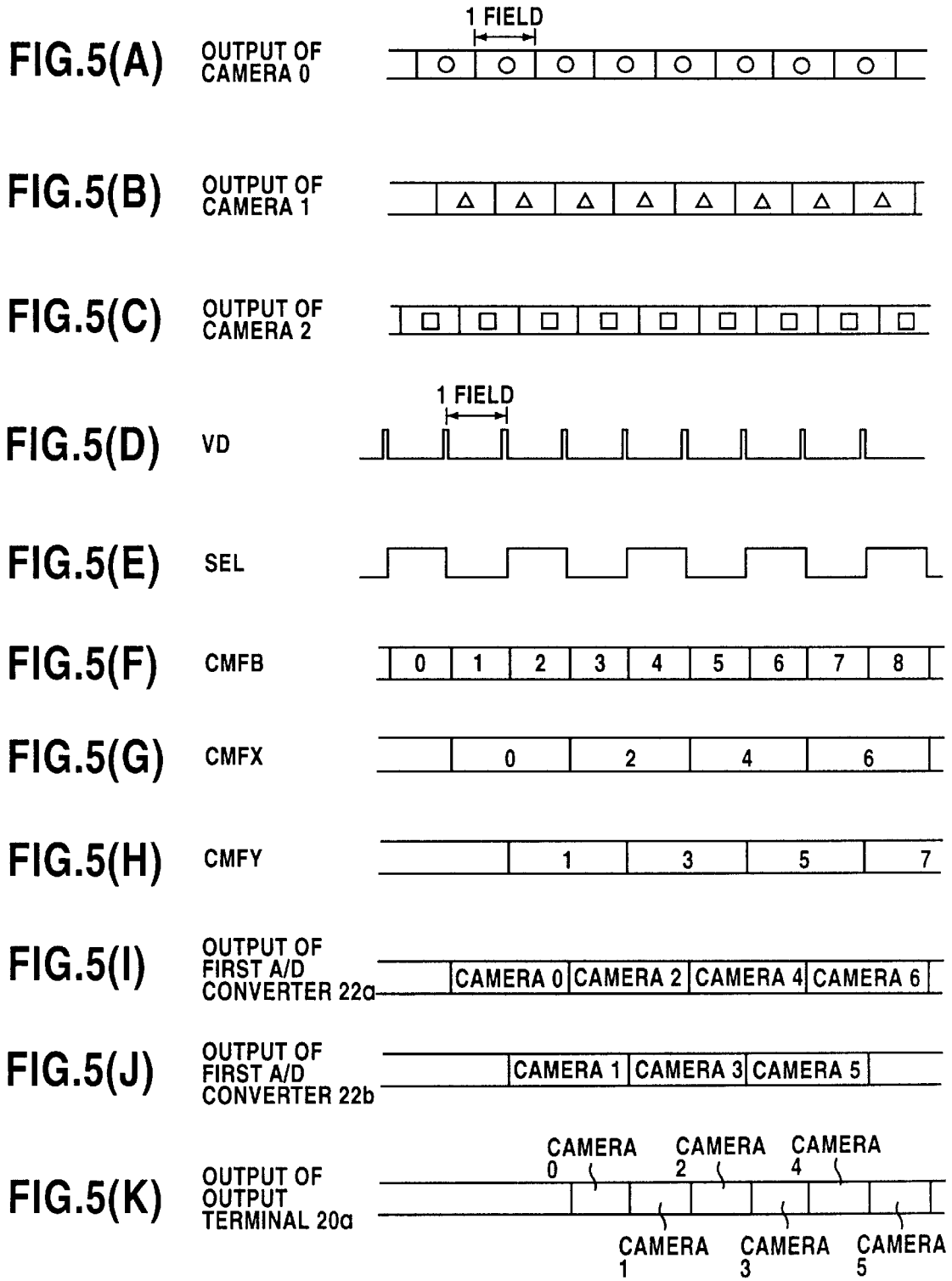

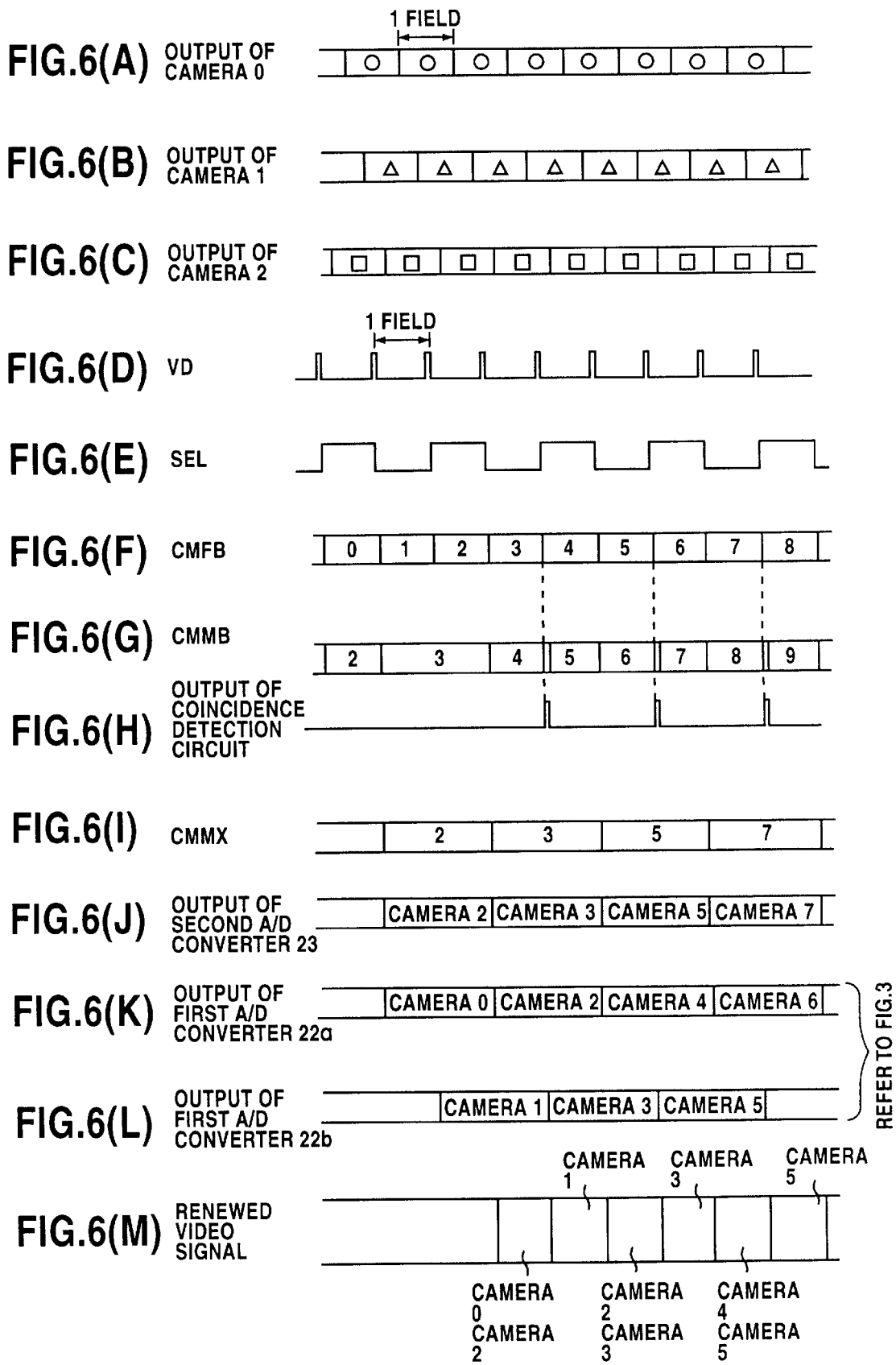

FIG. 8
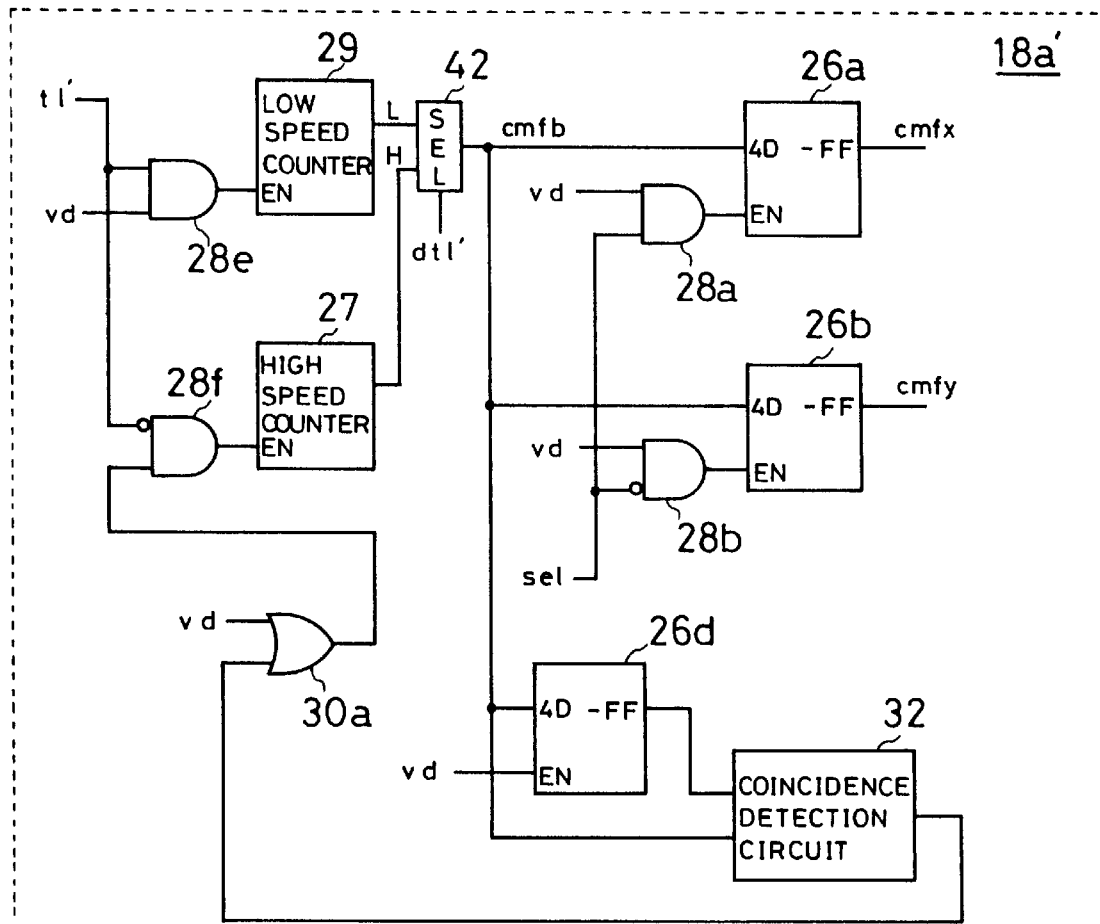
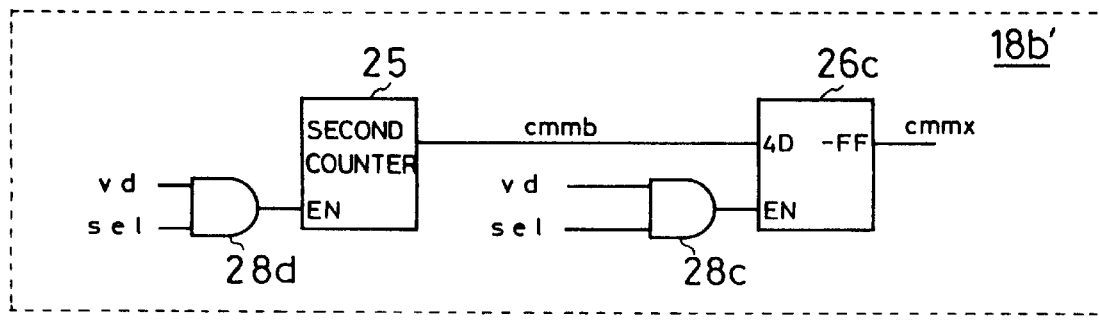

F I G. 10
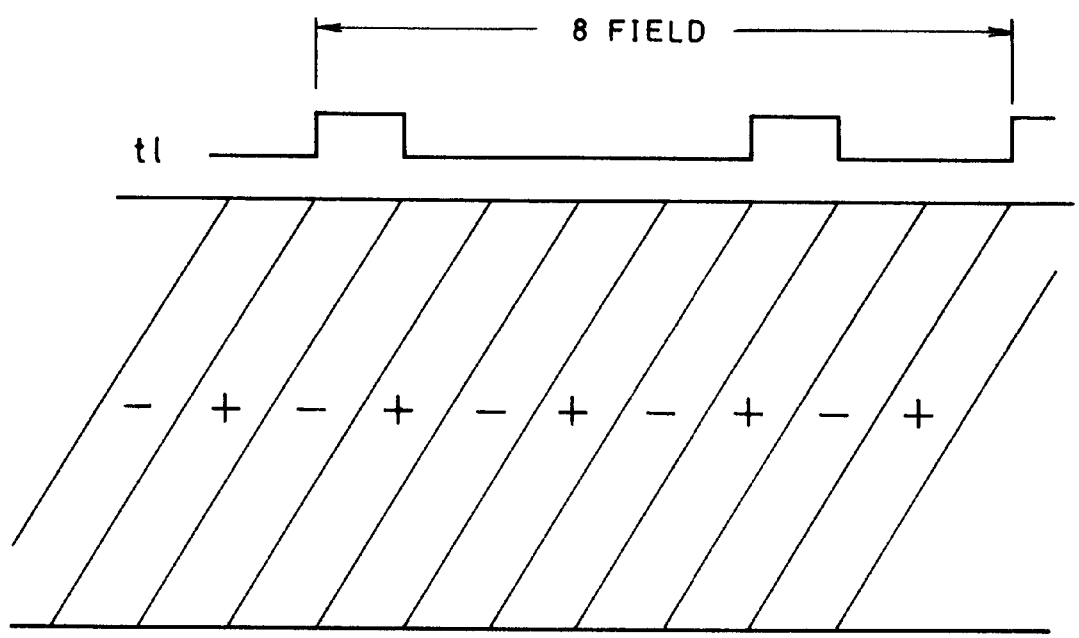

FIG.12(A) PRIOR ART
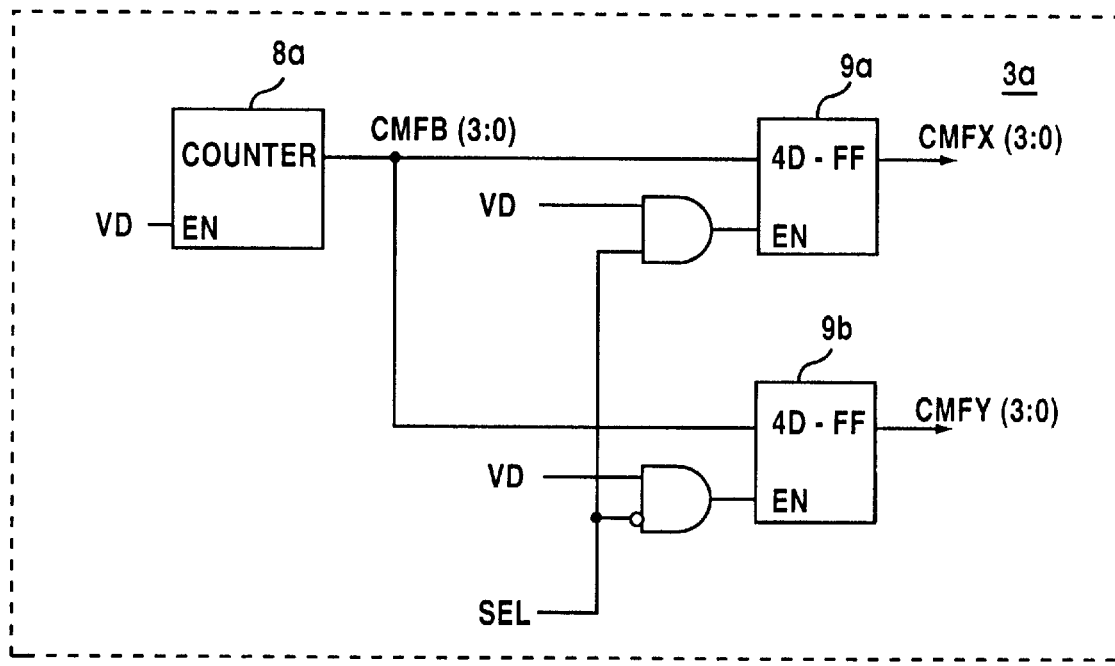
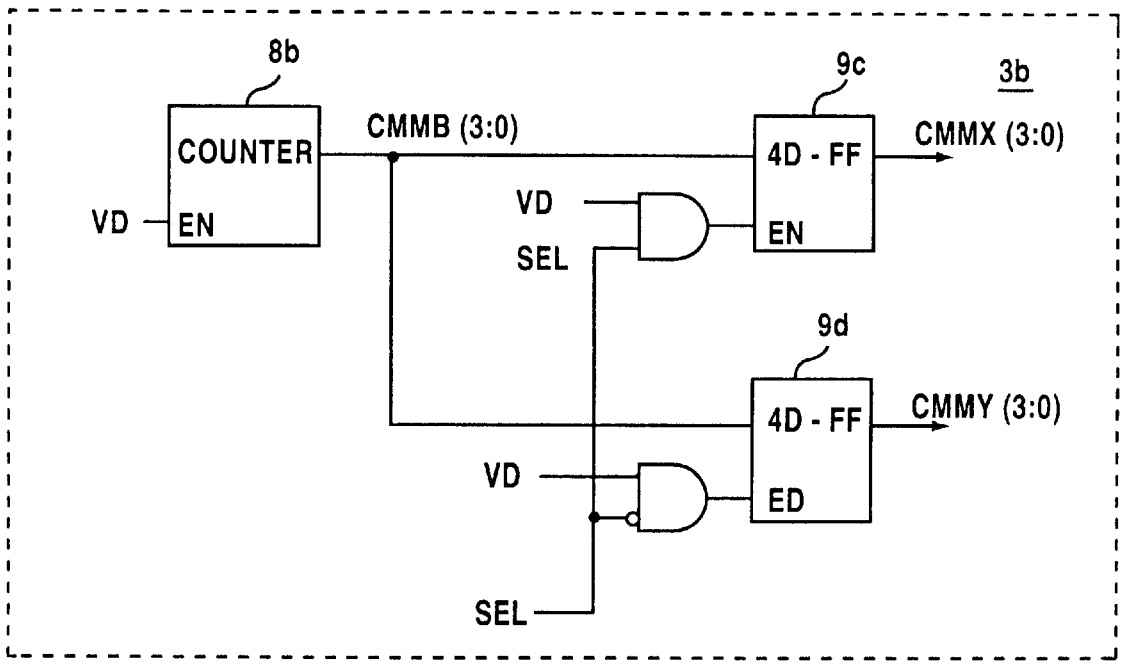
FIG. 12(B)
PRIOR ART

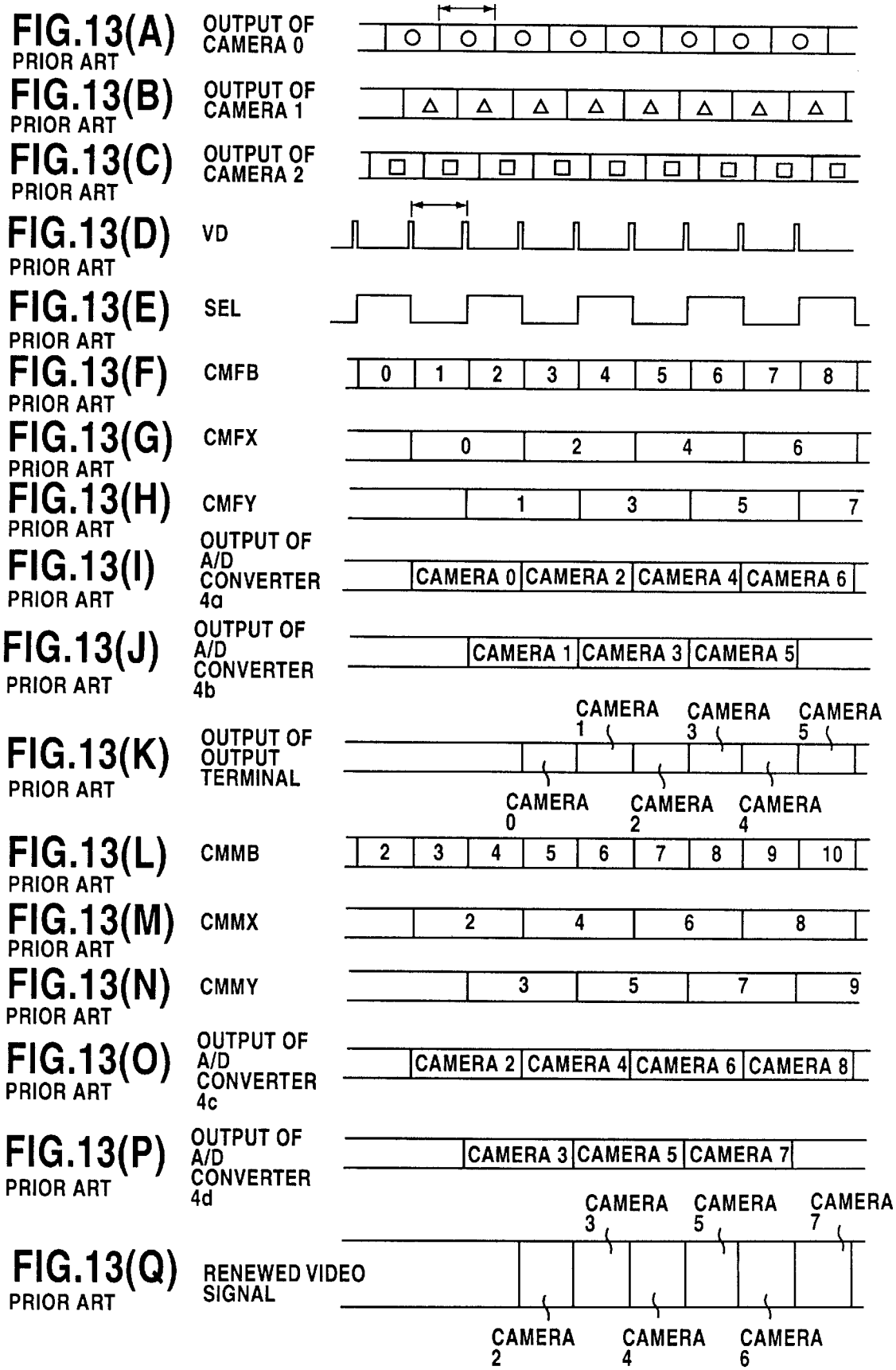

VIDEO SIGNAL PROCESSING APPARATUS

BACKGROUND OF THE INVENTION

1. Field of the Invention

The present invention relates to a video signal processing apparatus. More specifically, the present invention relates to a video signal processing apparatus which includes a time-division multiplex circuit for multiplexing a plurality of video signals so as to record the plurality of video signals by a video tape recorder, and a multi-display circuit for simultaneously displaying a plurality of images on a plurality of monitor screens.

2. Description of the Related Art

In the conventional kind of video signal processing apparatus 1 shown in FIG. 11, a plurality of video signals from cameras 0 to 15 are applied to switches 2a and 2b included in a time-division multiplex circuit 1a and switches 2c and 2d included in a multi-display circuit 1b such that any video signals are selected by control signals "cmfx", "cmfy", "cmmx" and "cmmy" outputted from switch control circuits 3a and 3b. Video signals selected by the switches 2a and 2b are converted into digital video signals by A/D converters 4a and 4b, and then inputted to memories 5a and 5b, each of which has a memory capacity equal to one field, and portions of the video signals, each of which is equal to one field, are written into the memories 5a and 5b, respectively. The video signals read-out from the memories 5a and 5b are multiplexed by a multiplexer 7a, whereby a time-division multiplex video signal is obtained.

In contrast, the video signals outputted from the switches 2c and 2d and converted into digital video signals by A/D converters 4c and 4d are written into any areas of a plurality of memory formed in memories 5c and 5d through selectors 6c and 6d. Then, sixteen (16) video signals read-out from the memories 5c and 5d are outputted to a monitor (not shown) through a multiplexer 7d and a D/A converter. Therefore, sixteen video images are simultaneously displayed on sixteen monitor screens in the monitor.

The switch control circuits 3a and 3b have the structure as that shown in FIG. 12. A reference pulse "vd" is inputted to respective counters 8a and 8b as an enable signal. Count values incremented by the enable signals are outputted from the counters 8a and 8b as control signals "cmfb" and "cmmb", and the control signal "cmfb" is applied to latch circuits 9a and 9b, and the control signal "cmmb" is applied to latch circuits 9c and 9d. Each of the latch circuits 9a to 9d is constituted by D-type flip-flop circuits of four (4) bits, and the control signals "cmfx", "cmfy", (commx) and "cmmy" which control the switch circuits 2a to 2d are outputted from the latch circuits 9a to 9d, respectively.

A timing chart of an operation according to the related art is shown in FIG. 13. The switch control circuit 3a outputs the control signals "cmfx" and "cmfy" which are incremented by two (2) at every two fields and have a phase difference equal to one field, as shown in FIGS. 13(D) and 13(H). Accordingly, the video signals shown in FIGS. 13(I) and 13(J) are outputted from the A/D converters 4a and 4b, and written into the memories 5a and 5d. The video signals read-out from the memories 5a and 5b are multiplexed by the multiplexer 7a, and therefore, the time-division multiplex video signal that the respective video signals are changed at every one field as shown in FIG. 13(K) is outputted from an output terminal.

In contrast, the switch control circuit 3b included in the multi-display circuit 1b also outputs the control signals "cmmx" and "cmmy" which are incremented by two (2) at every two field and have a phase difference equal to one field, as shown in FIGS. 13(M) and 13(N). Accordingly, the video signals outputted from the A/D converters 4c and 4d at timings shown in FIGS. 13(O) and 13(P) are written into the memories 5c and 5d, and then, the sixteen video signals are read-out from the memories 5c and 5d. Therefore, the monitor screens corresponding to the video signals shown in the FIG. 13(Q) are renewed.

However, since a renewal speed of the monitor screens depends on the number of the A/D converters provided in the multi-display circuit, it is necessary to increase the number of A/D converters in order to increase the renewal speed.

SUMMARY OF THE INVENTION

Therefore, a principal object of the present invention is to provide a novel video signal processing apparatus.

Another object of the present invention is to provide a video signal processing apparatus capable of increasing a renewal speed of monitor screens with no additional A/D converters.

A video signal processing apparatus according to the present invention comprises: a time-division multiplex circuit for outputting a plurality of input video signals in a time-division manner with utilizing a first memory; a multi-display circuit for simultaneously outputting the plurality of input video signals with utilizing a second memory on a plurality of monitor screens; wherein the time-division multiplex circuit includes at least one first A/D converter, and a first switching means for selectively outputting the input video signals to the first A/D converter, and an output of the first A/D converter is applied to the multi-display circuit.

The plurality of input video signals are applied to the time-division multiplex circuit and the multi-display circuit. In the time-division multiplex circuit, the first switching means selectively outputs the inputted video signals to the first A/D converter. The selected video signal is converted into a digital video signal by the first A/D converter, and then, written into the first memory and applied to the multi-display circuit. The multi-display circuit writes the video signal being applied from the first A/D converter and one of the input video signals into the second memory. The video signal read-out from the first memory is subjected to a time-division multiplexing, and a plurality of video signals read-out from the second memory are simultaneously outputted on the plurality of monitor screens. Accordingly, the monitor screen is renewed in correspondence to the video signal newly written into the second memory.

In one aspect of the present invention, the video signal from the first A/D converter, and a video signal selected by a second switching means and converted into a digital video signal by a second A/D converter are stored into predetermined memory areas of the second memory, and then, a plurality of video signals including such the video signals are read-out from the second memory, for example. Accordingly, the monitor screen is renewed by the video signal newly stored.

In one embodiment of the present invention, the switch control means includes a first counter for controlling the first switching means and a second counter for controlling the second switching means each of which is incremented by a reference pulse. The second counter is further incremented by an incrementing means at a time that an output of the first counter and an output of the second counter become coincident with each other. Therefore, video signals different from each other are outputted from the first switching means and the second switching means, and different monitor screens are renewed.

In another aspect of the present invention, the switch control means includes a low speed counter and a high speed counter which are incremented at a low speed and a high speed, respectively, in a case where a video tape recorder receiving the output of the time-division multiplex circuit is in a time lapse recording mode, for example. One of count values of the low speed counter and the high speed counter is selected by a selecting means, and the first switching means is controlled by the selected count value, and the monitor screens are renewed in response to the video signals outputted from the first switching means. In addition, the count value of the low speed counter is selected at every predetermined odd fields, and the video signals selected by the first switching means in response to the count value of the low speed counter is applied to the time-division multiplex circuit.

In another embodiment of the present invention, the high speed counter is incremented in a case where the same count value is succeedingly outputted from the selecting means and the selecting means selects the output of the high speed counter, for example. Accordingly, it is possible to prevent that the same monitor screen is succeedingly renewed in such a case.

According to the present invention, since the output of the first A/D converter is inputted into the multi-display circuit, it is possible to renew a plurality of monitor screens without increasing the number of the A/D converters in the multi-display circuit. That is, it is possible to increase the renewal speed of the monitor screens. Furthermore, since the output of the second A/D converter is made to be different from the output of the first A/D converter, it is possible to efficiently renew the monitor screens.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing a monitor of FIG. 1 embodiment;

FIG. 4 is an illustrative view showing memories of FIG. 1 embodiment;

FIG. 5 is a timing chart showing an operation of a time-division multiplex circuit of FIG. 1 embodiment;

FIG. 6 is a timing chart showing an operation of a multi-display circuit of FIG. 1 embodiment;

FIG. 8 is a block diagram showing a switch control circuit of FIG. 7 embodiment;

FIG. 10 is an illustrative view showing a portion of the operation of FIG. 7 embodiment;

FIG. 12 is a block diagram showing a switch control circuit of the related art shown in FIG. 11; and FIG. 13 is a timing chart showing a portion of an operation of the related art shown in FIG. 11.

DETAILED DESCRIPTION OF THE PREFERRED EMBODIMENTS

Figure 1:
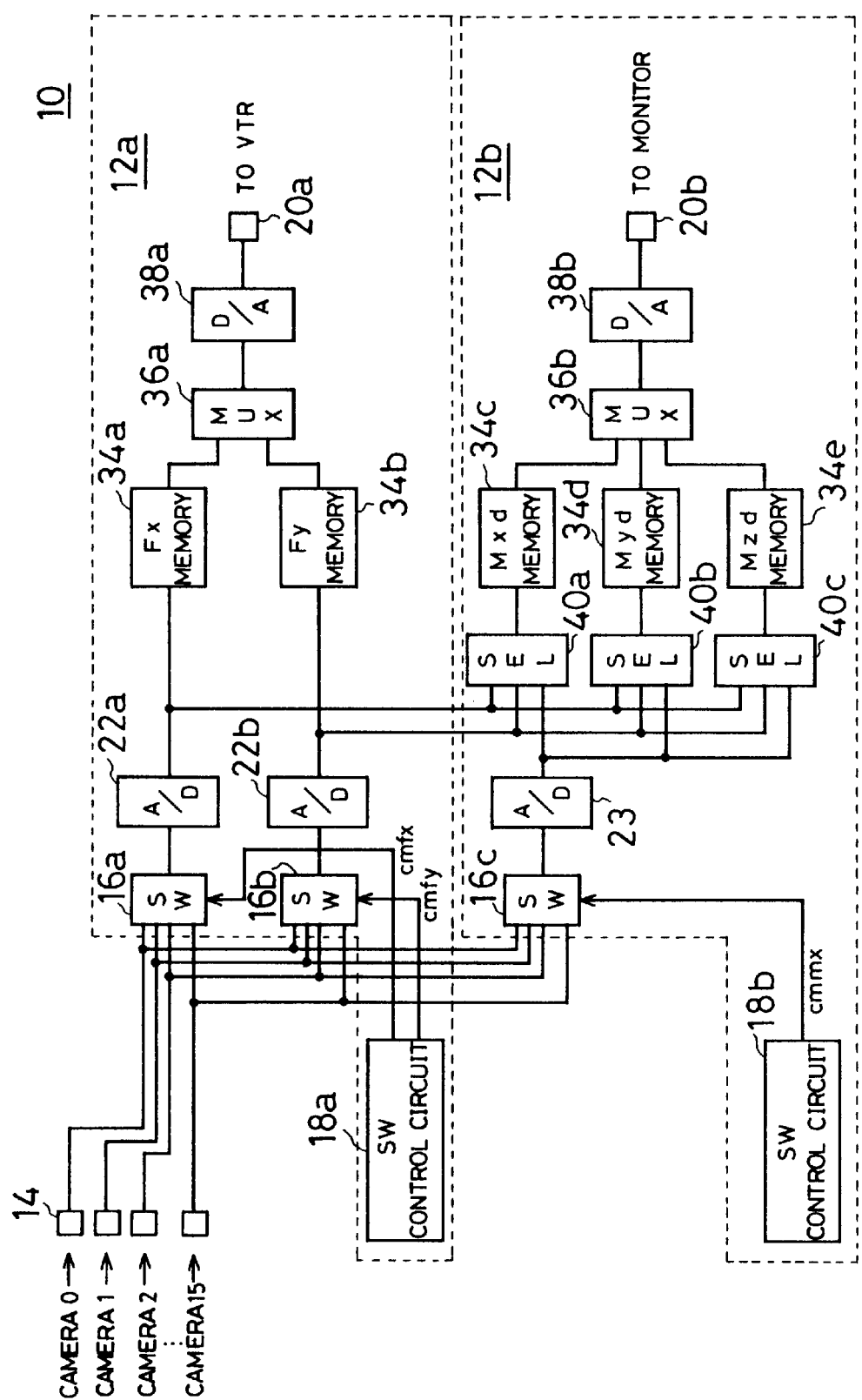
FIG. 1 is a block diagram showing one embodiment according to the present invention.
Figure 3:
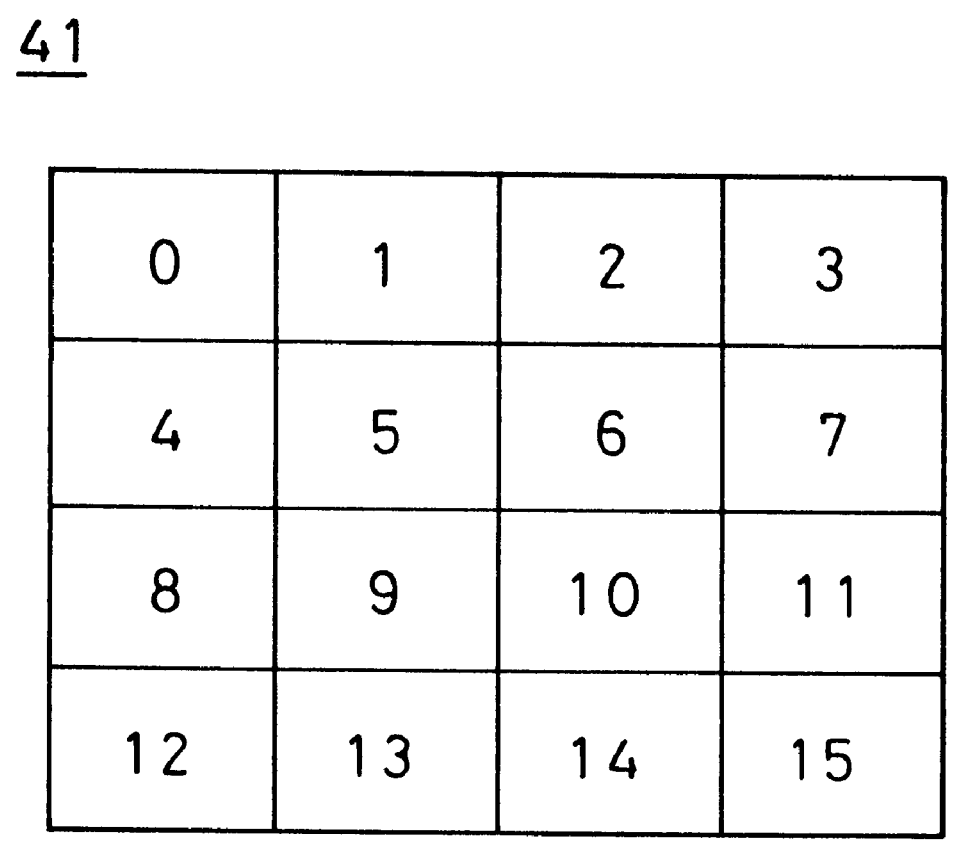

A video signal processing apparatus 10 of the embodiment shown in FIG. 1 includes a time-division multiplex circuit 12a and a multi-display circuit 12b. The time-division multiplex circuit 12a multiplexes a plurality of inputted video signals in a time-division manner to output to a video tape recorder (not shown). The multi-display circuit 12d simultaneously outputs images of the plurality of video signals on a plurality of monitor screens formed in a monitor 41 shown in FIG. 3.

The plurality of video signals inputted from a plurality of input terminals 14, that is, the video signals from cameras 0 to 15 are applied to switches 16a and 16b as a first switching means provided in the time-division multiplex circuit 12a and a switch 16c as a second switching means provided in the multi-display circuit 12b. Each of the switches 16a and 16b selectively outputs one of the plurality of video signals in response to each of control signals "cmmx" and "cmmy" outputted from a switch control circuit 18a. Similarly, the switch 16c is controlled by a control signal "cmmx" outputted from a switch control circuit 18b, and selectively outputs one of the plurality of video signals. Then, the video signals selected by the switches 16a to 16c are converted into digital video signals by first A/D converters 22a and 22b and a second A/D converter 23, respectively.

Figure 2:
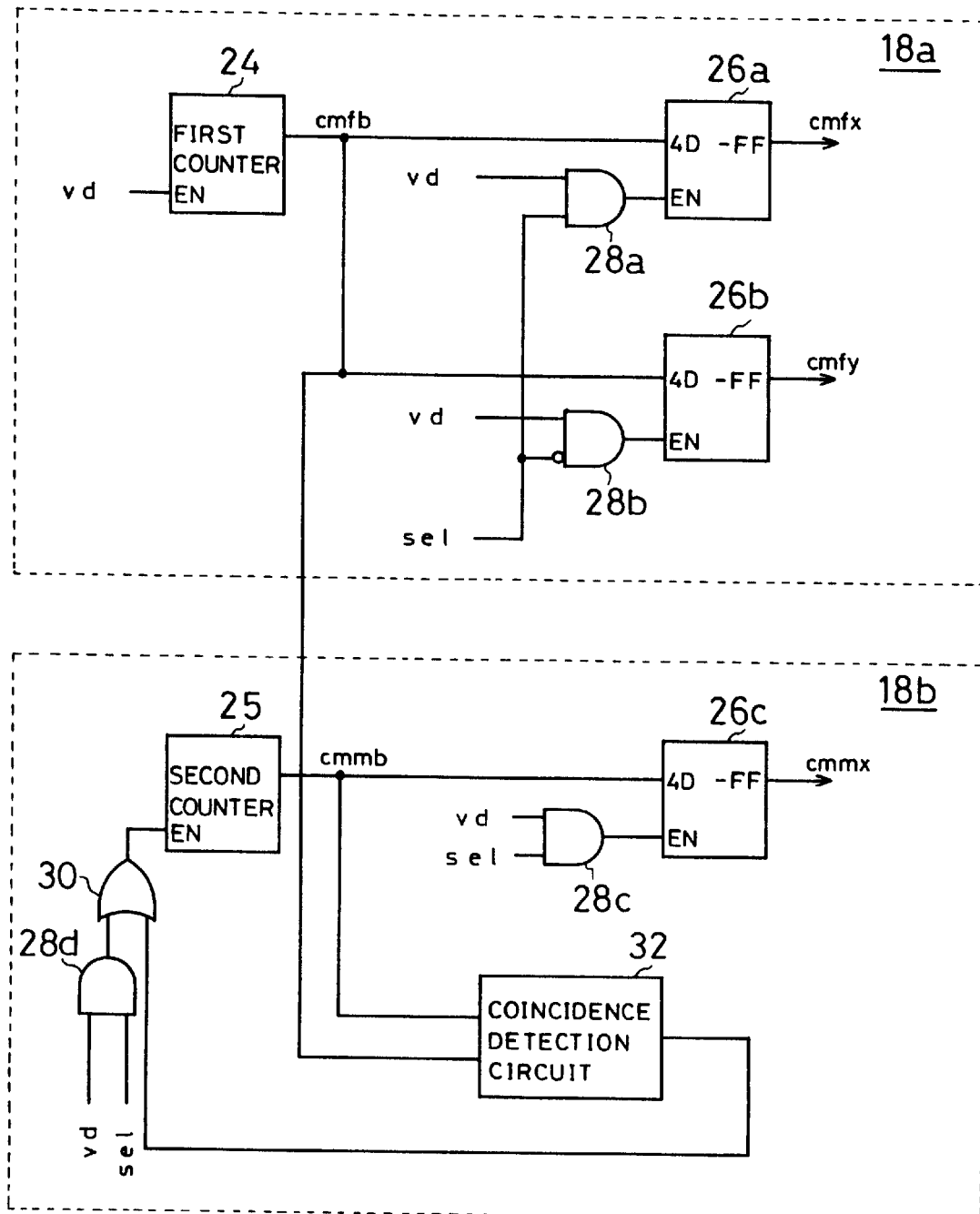
FIG. 2 is a block diagram showing a switch control circuit of FIG. 1 embodiment.

The switch control circuit 18a includes a first counter 24 as shown in FIG. 2. The first counter 24 is incremented by a reference pulse "vd" and outputs a count value as a control signal "cmfb" to latch circuits 26a and 26b each of which is constituted by D-type flip-flop circuits of four (4) bits. Furthermore, the switch control circuit 18a includes two AND gates 28a and 28b. The AND gate 28a receives the reference pulse "vd" and a selection signal "sel" and outputs an enable signal, i.e. a latch signal to the latch circuit 26a. The AND gate 28b receives the reference pulse "vd" and an inverted signal of the selection signal "sel" and outputs a latch signal to the latch circuit 26b.

Accordingly, when the latch signals inputted to the latch circuits 26a and 26b are high levels, respectively, the latch circuits 26a and 26b latch the count value of the first counter 24, respectively. Then, the count values latched by the latch circuits 26a and 26d are applied to the switches 16a and 16b as the control signals "cmfx" and "cmfy", respectively.

The switch control circuit 18b includes a second counter 25 incremented by an ANDed signal of the reference pulse "vd" and the selection signal "sel". Then, a count value of the second counter 25 is applied to a latch circuit 26c constituted by D-type flip-flop circuits of four (4) bits and a coincidence detection circuit 32 as a control signal "cmmb". A latch signal outputted from an AND gate 28c which receives the reference pulse "vd" and the selection signal "sel" is inputted to the latch circuit 26c which latches the count value of the second counter 25 in response to the latch signal so as to output the control signal "cmmx".

The count values outputted from the first counter 24 and the second counter 24 are inputted to the coincidence detection circuit 32. If the two count values are coincident with each other, the coincidence detection circuit 32 applies a coincidence signal to the second counter 25 through an OR gate 30. Accordingly, though the second counter 25 is basically incremented by the ANDed signal of the reference pulse "vd" and the selection signal "sel", if the count values from the first counter 24 and the second counter 25 are coincident with each other, the second counter 25 is incremented by the coincidence signal.

Returning back to FIG. 1, the switches 16a and 16b are controlled by the control signals "cmfx" and "cmfy", respectively. The plurality of video signals being selectively outputted are converted into digital video signals by the first A/D converters 22a and 22b, and then, written into memories 34a and 34b as a first memory, respectively. The video signals read-out from the memories 34a and 34b are multiplexed in a time-division fashion by a multiplexer 36a, and a time-division multiplex video signal generated by the multiplexer 36a is applied to the video tape recorder through a D/A converter 38a and an output terminal 20a. In addition, each of the memories 34a and 34b has a memory capacity equal to one field, and a portion of each video signal equal to one field is written therein.

The switch 16c is controlled by the control signal "cmfx", and the plurality of video signals selectively outputted from the switch 16c are converted into digital video signals by the second A/D converter 23.

Figures 4A, 4B, 4C:
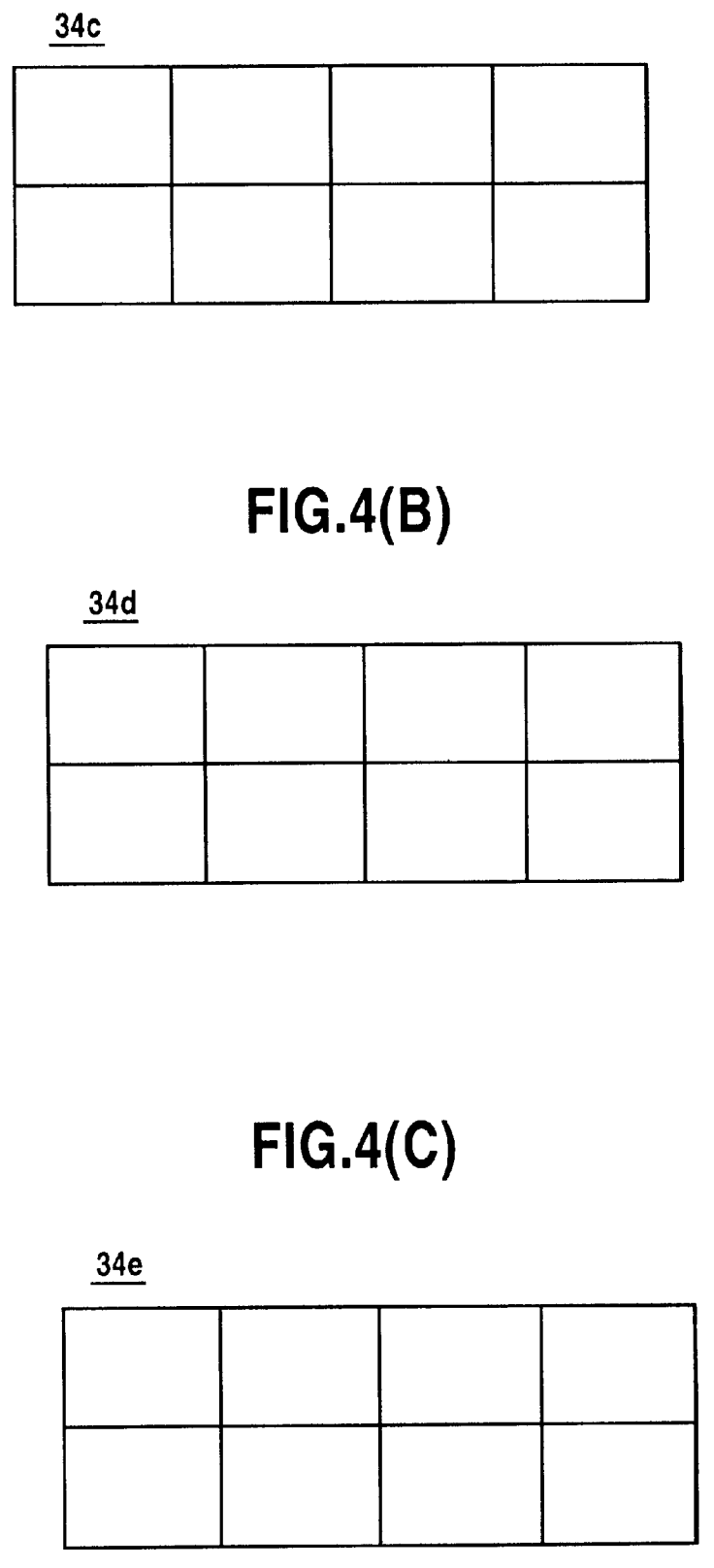

Respective selectors 40a to 40c select one of the video signals outputted from the first A/D converters 22a and 22b and the second A/D converter 23 so as to apply to respective memories 34c to 34e as a second memory. Each of the memories 34c to 34e has eight (8) memory areas as shown in FIGS. 4(A) to 4(C), and each of the memory areas has a memory capacity of 1/16 field. Accordingly, the video signals from the selectors 40a to 4c are written into memory areas that no reading are executed at a current time. Though descriptions about a way of writing and a timing of the writing into the memories 34c to 34e are omitted, the video signal equal to one field included in each of the output of the first A/D converters 22a and 22b and the second A/D converter 23 is thinned-out into 1/4 in a column direction and a row direction and written into a predetermined memory area. When the writing of the video signal is completed, sixteen (16) video signals including the video signals are read-out, and outputted from an output terminal 20 through a multiplexer 36b and a D/A converter 38b. Accordingly, the sixteen video signals are outputted on sixteen (16) monitor screens formed in the monitor 41 shown in FIG. 3.

An operation of the time-division multiplex circuit 12a is described with referring to FIG. 5. In addition, as conjectured from FIGS. 5(A) to 5(C), the video signals having phases being not coincident with each other are outputted from the cameras 0 to 15.

The reference pulse "vd" inputted to the first counter 24 is a pulse which is generated on the basis of an operating frequency for reading the memories 34a to 34e and rises at every one field. Accordingly, the first counter 24 is incremented at every one field as shown in FIG. 5(F). Furthermore, the selection signal "sel" applied to the latch circuits 26a and 26b is a signal having a level switched at every one field by the reference pulse "vd" as shown in FIG. 5(E). Since the selection signal "sel" is applied to the AND gate 28a as it is, an even number count value incremented by two (2) at every two fields as shown in FIG. 5(D) is outputted from the latch circuit 26a as the control signal "cmfx". Furthermore, since the inverted signal of the selection signal "sel" is applied to the AND gate 28b, an odd number count value incremented by two (2) at every two fields is outputted from the latch circuit 26b as the control signal "cmfy" with being delayed by one field from the control signal "cmfx" as shown in FIG. 5(H). Accordingly, the video signals corresponding to the count values indicated by the control signals "cmfx" and "cmfy" are outputted from the respective switches 16a and 16b, i.e. the respective first A/D converters 22a and 22b, as shown in FIGS. 5(I) and 5(J).

Thus, since the video signals are changed at every two fields, it is possible to write the video signals from a first line to a last line into the memories 34a and 34b. Furthermore, since the video signals are read-out from the memories 34a and 34b at a timing just after the inputs therefor are completed, and the multiplexer 36a is controlled by the selection signal "sel", the video signals being time-divided at every one field as shown in FIG. 5(K) are outputted from the output terminal 20a.

In contrast, with referring to FIG. 6, though the second counter 25 is basically incremented at every two fields by the ANDed signal of the reference pulse "vd" and the selection signal "sel", if the coincidence signal is outputted as shown in FIG. 6(H), the second counter 25 is further incremented. Accordingly, the second counter 25 is incremented at every two fields or every one field as shown in FIG. 6(G). Since the latch circuit 26c latches the control signal "cmmb" at every two fields, the control signal "cmmx" is incremented by one (1) or two (2) at every two fields as shown in FIG. 6(I). Since the switch 16c changes the output in response to the control signal "cmmx", the video signals shown in FIG. 6(J) are outputted from the second A/D converter 23.

Then, the video signals from the first A/D converters 22a and 22b and the second A/D converter 23 are applied to the memories 34c to 34e through the selectors 40a to 40c, and written into predetermined memory areas within a predetermined field. Since the sixteen video signals including such the video signals are read-out from the memories 34c to 34e at a timing just after the inputs of the video signals are completed, the video signals shown in FIG. 6(M) are renewed.

An operation of the second counter 25 in response to the coincidence signal from the coincidence detection circuit 32 will be described more detailed in the following. If the control signal "cmmb" from the second counter 25 and the control signal "cmfb" from the first counter 24 are coincident with each other as shown in FIGS. 6(F) and 6(G), the coincidence detection circuit 32 outputs the coincidence signal as shown in FIG. 6(M). The coincidence signal is applied to the second counter 25 through the OR gate 30, whereby the second counter 25 is incremented. Accordingly, the control signal "cmmb" becomes different from the control signal "cmfb", and the video signal outputted from the first A/D converters 22a and 22b and the second A/D converter 23 are not to be duplicated with each other as shown in FIGS. 6(J) to 6(L).

According to the above described embodiment, since the outputs of the first A/D converter 22a and 22b are applied to the multi-display circuit 12b, it is possible to renew all the monitor screens in a short time without increasing the number of the A/D converters. That is, it is possible to increase a renewal speed of the monitor screens with no additional A/D converter. Furthermore, since the video signals different from each other are selected by the switches 16a to 16c, it is possible to efficiently renew the monitor screens.

Figure 7:
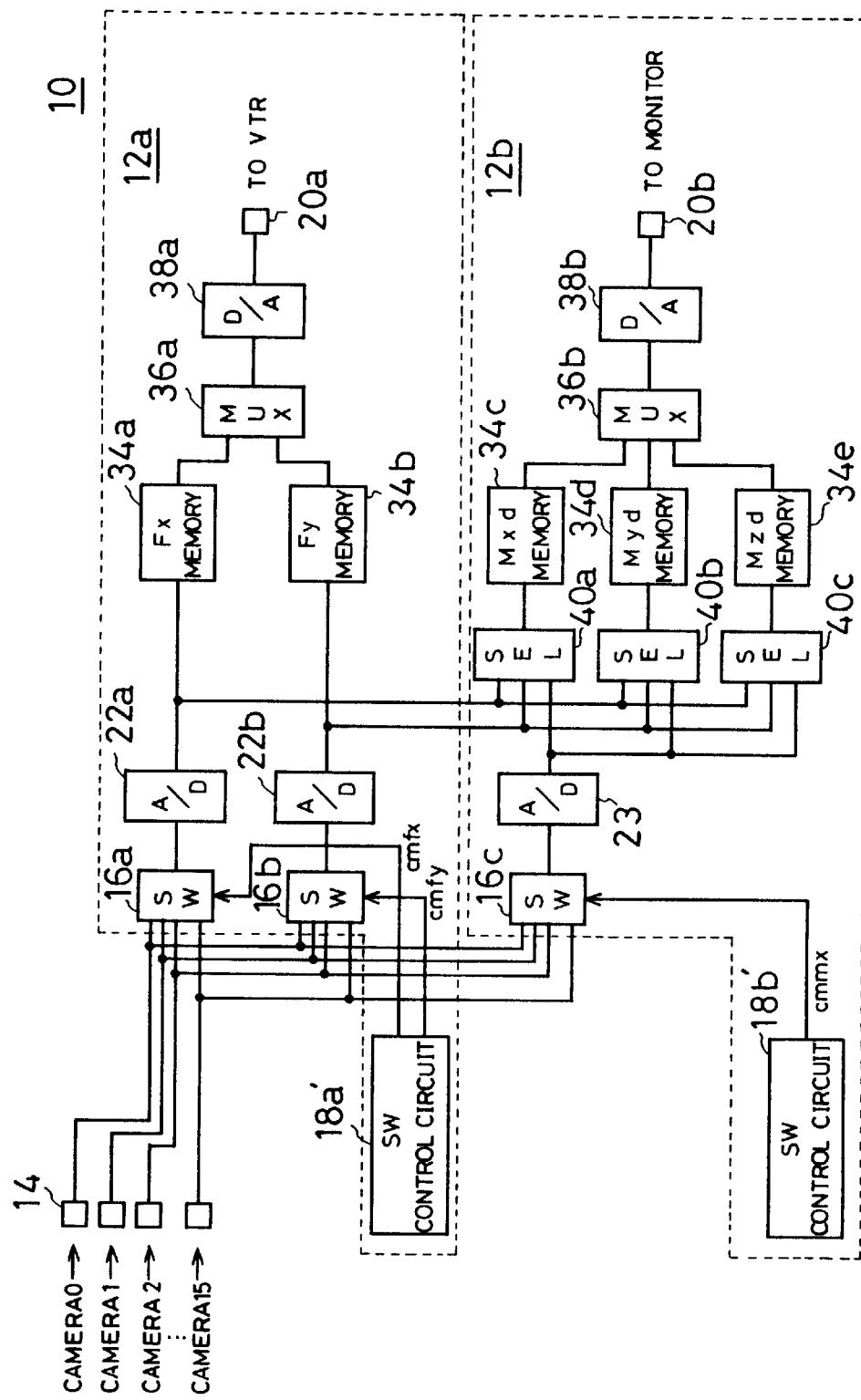
FIG. 7 is a block diagram showing another embodiment according to the present invention.

A video signal processing apparatus 10 of another embodiment shown in FIG. 7 is a circuit which can be applied to a video tape recorder which adopts a time lapse recording mode in which a video signal is intermittently recorded on a video tape running at a low speed, and control circuits 18a' and 18b' included therein are constructed as shown in FIG. 8. However, since the video signal processing apparatus 10 shown in FIG. 7 is the same as the FIG. 1 embodiment except that point, a duplicate description will be omitted by using the same reference numerals for the same or similar circuits.

Figure 9:
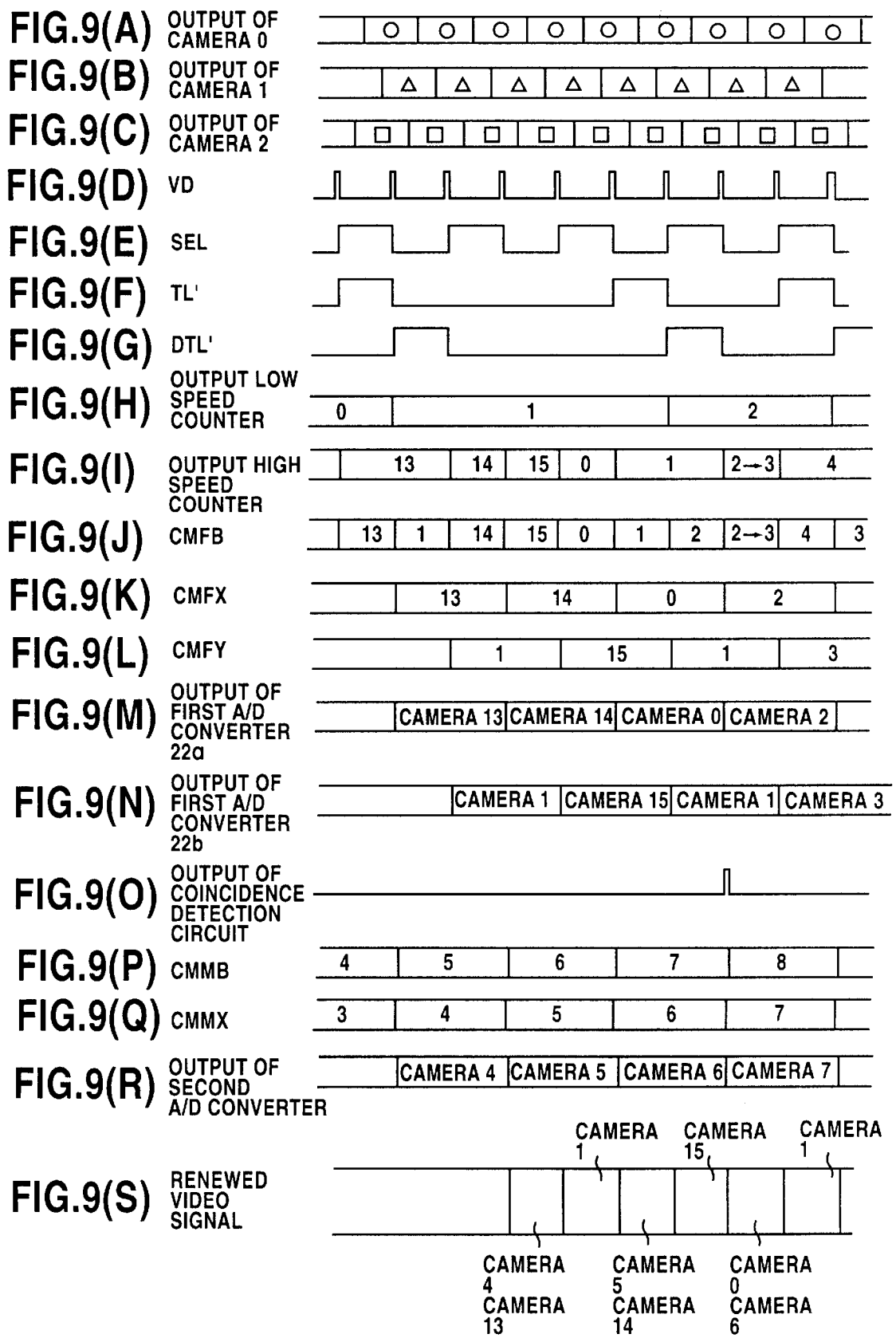
FIG. 9 is a timing chart showing a portion of an operation of FIG. 7 embodiment.
Figure 11:
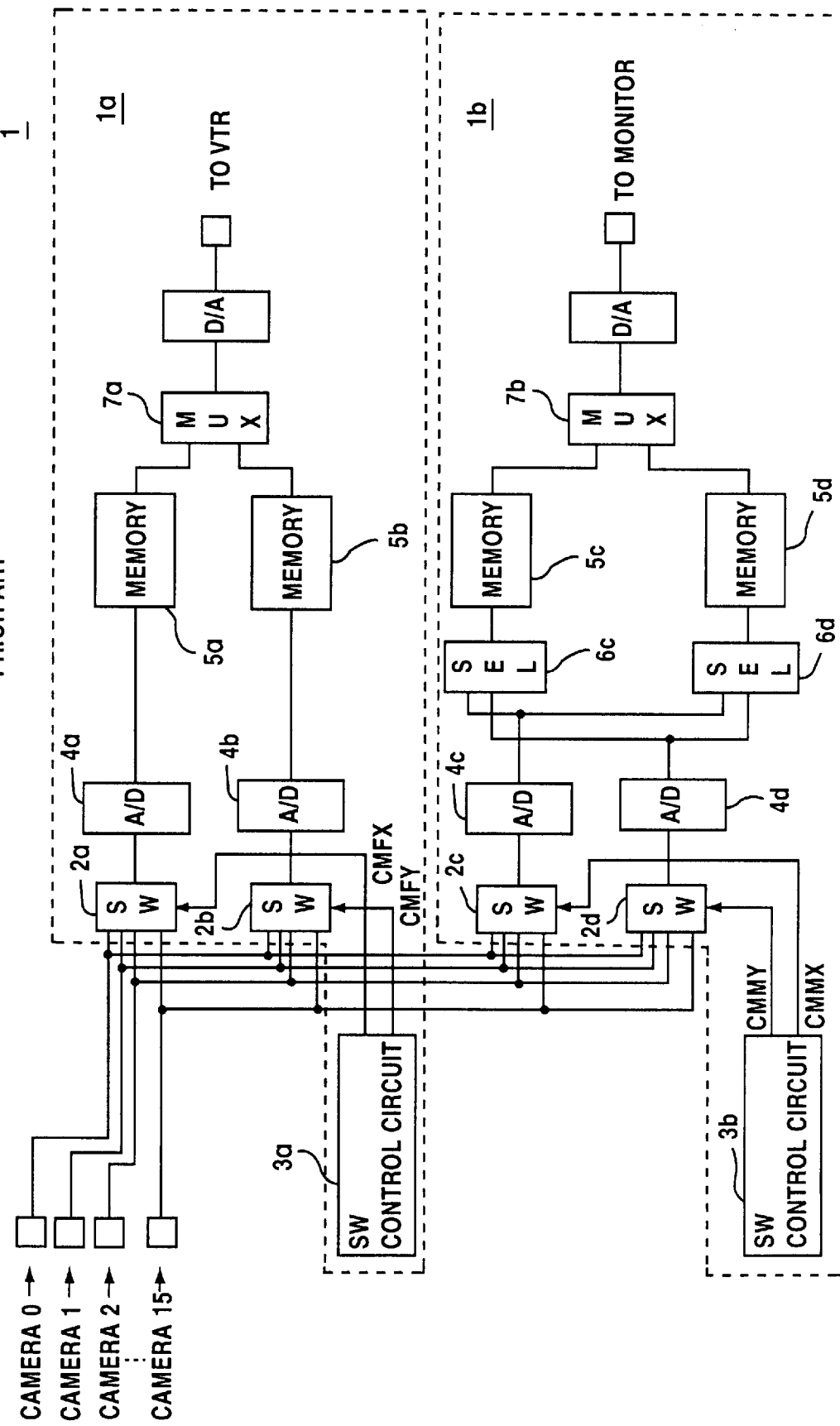
FIG. 11 is a block diagram showing a related art.

The switch control circuit 18a' includes a low speed counter 29 incremented by an output of an AND gate 28e and a high speed counter 27 incremented by an output of an AND gate 28f. The reference pulse "vd" shown in FIG. 9(D) and a timing signal "tl'" shown in FIG. 9(F) are applied to the AND gate 28e, and an inverted signal of the timing signal "tl'" and an output of an OR gate 30a are applied to the AND gate 28f. In addition, the timing signal "tl'" is a signal having the same waveform as that of the timing signal "tl" which becomes a high level at every predetermined odd number of the fields, i.e. in a first field and a sixth field during predetermined eight (8) fields as shown in FIG. 10. Since in the time lapse recording mode, the video tape runs at a quarter a speed in a normal mode, the timing signal "tl" should actually become the high level once in four (4) fields; however, azimuth angles of recorded video signals are always the same in such a case. Accordingly, the timing signal "tl" which becomes the high level at the above described timings is generated, and the timing signal "tl'" having the same waveform as that of the timing signal "tl" is used for the switch control circuit 18a'.

The coincidence signal outputted from the coincidence detection circuit 32 and shown in FIG. 9(O) and the reference pulse "vd" are applied to the OR gate 30a. The low speed counter 29 is incremented by the reference pulse "vd" obtained at a time that the timing signal "tl'" becomes a high level, as shown in FIG. 9(H). The high speed counter 27 is basically incremented by the reference pulse "vd" outputted from the OR gate 30a at a time that the timing signal "tl'" becomes a low level, as shown in FIG. 9(I). That is, in the time lapse recording mode, the high speed counter 27 is incremented at four (4) times a speed of the low speed counter 29.

Count values of the low speed counter 29 and the high speed counter 27 is selected by a selector 42 in response to a timing signal "dtl'" generated by delaying the timing signal "tl'" by one field. More specifically, the count value of the high speed counter 27 is selected at a time that the timing signal "dtl'" is a high level, and the count value of the low speed counter 29 is selected at a time that the timing signal "dtl'" is a low level. Therefore, the count value of the low speed counter 29 is selected at the first field and the sixth field during the predetermined eight fields. The selected count value becomes the control signal "cmfb". As similar to FIG. 2 embodiment, since the control signal "cmfb" is latched by latch circuits 26a and 26b, the control signal "cmfx" shown in FIG. 9(K) and the control signal "cmfy" shown in FIG. 9(L) are outputted.

In addition, though various video signals are outputted from the first A/D converters 22a and 22b in response to the control signals "cmfx" and "cmfy" as shown in FIGS. 9(M) and 9(N), since writing signals on the basis of the timing signal "tl" are applied to the memories 34a and 34b, it is possible to write the video signals from the camera 0 to 15 into the memories 34a and 34b in a predetermined order, therefore, a desired time-division multiplex signal is obtained.

The control signal "cmfb" from the selector 42 is also applied to a latch circuit 26d which receives the reference pulse "vd" as a latch signal. Then, an output of the latch circuit 26d and the control signal "cmfb" are applied to the coincidence detection circuit 32. That is, the control signal "cmfb" at a preceding field and the control signal "cmfb" at a current field are applied to the coincidence detection circuit 32. Accordingly, at a time that the control signal "cmfb" has the same count value for two successive fields as shown in FIG. 9(J), the coincidence detection circuit 32 outputs the coincidence signal, and increments the high speed counter 27 as understood from FIG. 9(I). However, if the coincidence signal is outputted at a time that the timing signal "tl'" is the high level, the high speed counter 27 is not incremented. Because, if the high speed counter 27 is incremented at a time that the timing signal "tl'" is a high level, it is impossible to obtain the desired time-division multiplex signal.

In contrast, as different from the FIG. 2 embodiment, the second counter 25 included in the switch control circuit 18b' is incremented by only an ANDed signal of the reference pulse "vd" and the selection signal "sel", and outputs the control signal "cmmb" having a count value as shown in FIG. 9(P). Accordingly, the control signal "cmmx" having a count value with being delayed by one field in comparison with the control signal "cmmb" as shown in FIG. 9(Q) is outputted from the latch circuit 26c, and therefore, the video signal corresponding to the count value is outputted from the second A/D converter 23 as shown in FIG. 9(R). The video signals outputted from the first A/D converters 22a and 22b and the second A/D converter 23 are written into the memories 34c to 34e, and the sixteen video signals are read-out from the memories 34c to 34e, and therefore, the video signals shown in FIG. 9(S) are renewed.

Thus, since the high speed counter 27 is incremented by the coincidence signal at a time that the timing signal "tl'" is the low level, it is possible to prevent the same video signal from being renewed for successive two fields, and therefore, the monitor screens can be renewed efficiently. Furthermore, since the outputs of the first A/D converters 22a and 22b are applied to the multi-display circuit 12b, it is possible to increase a renewal speed of the monitor screens without any additional A/D converter.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video signal processing apparatus, comprising:
   a time-division multiplex circuit for outputting a plurality of video signals in a time division manner utilizing a first memory;
   a multi-display circuit for simultaneously outputting images of said plurality of input video signals utilizing a second memory on a plurality of monitor screens, wherein
   said time-division multiple circuit includes a first switching means for selecting one of said plurality of video signals, a first A/D converter for converting an input video signal selected by said first switching means into input video signal data, and a first applying means for applying said input video signal data to said first memory, and
   said multi-display circuit includes a second applying means for applying said input video signal data outputted from said first A/D converter to said second memory.

2. A video signal processing apparatus according to claim 1, wherein said multi-display circuit further includes a second switching means for selecting one of said plurality of video signals, and a second A/D converter for converting an input video signal selected by said second switching means into input video signal data, and said second memory includes a plurality of memory areas in which said input video signal data outputted from said first A/D converter and said second A/D converter can be stored.

3. A video signal processing apparatus according to claim 2, further comprising: a switch control means for controlling said second switching means such that said second switching means outputs a video signal different from a video signal outputted from said first switching means.

4. A video signal processing apparatus according to claim 3, wherein said switch control means includes a first counter which is incremented by a predetermined pulse and for controlling said first switching means, a second counter which is incremented by said predetermined pulse and for controlling said second switching means, a coincidence detection means for detecting a coincidence between an output of said first counter and an output of said second counter, and an incrementing means for incrementing said second counter in response to a detection result of said coincidence detection detection means.

5. A video signal processing apparatus according to claim 1, further comprising a switch control means for controlling said first switching means; wherein an output of said time-division multiplex circuit is applied to a video tape recorder, and said switch control means includes a low speed counter incremented at a low speed in a case where said video tape recorder is in a predetermined mode, a high speed counter incremented at a high speed in a case where said video tape recorder is in said predetermined mode, and a selecting means for selecting one of an output of said low speed counter and an output of said high speed counter, and said first switching means is controlled by an output of said selecting means.

6. A video signal processing apparatus according to claim 5, wherein said predetermined mode is a time lapse recording mode, and said selecting means selects the output of said low speed counter at every predetermined odd number of the fields.

7. A video signal processing apparatus according to claim 6, wherein said switch control means includes an incrementing means for incrementing said high speed counter at a time that the same count value is successively outputted from said selecting means and said selecting means selects the output of said high speed counter.

* * * * *